Jan. 13, 1959 H. STRAHMANN 2,868,143
APPARATUS FOR MAKING BREAD AND PASTRY DOUGH
Original Filed Sept. 28, 1953 3 Sheets-Sheet 1
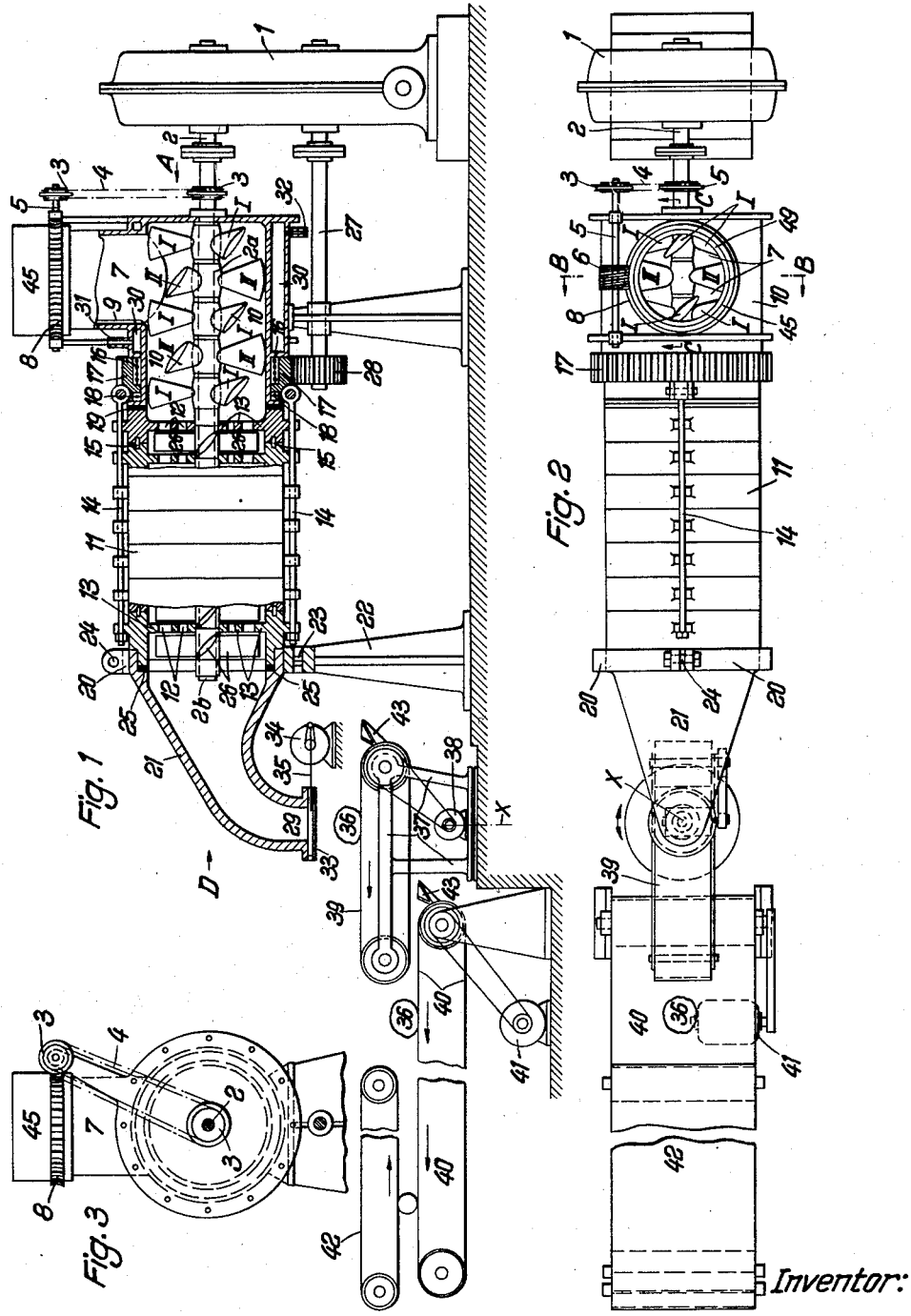
Inventor:
HANS STRAHMANN
BY
Michael S. Strieker

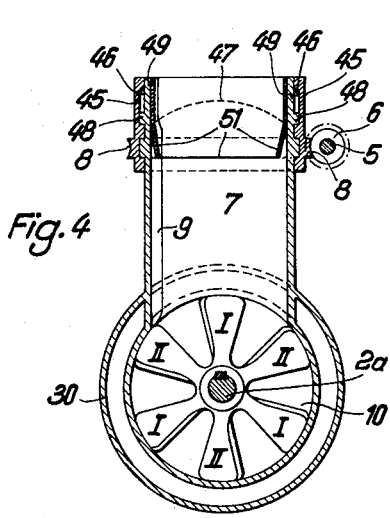
Fig. 4
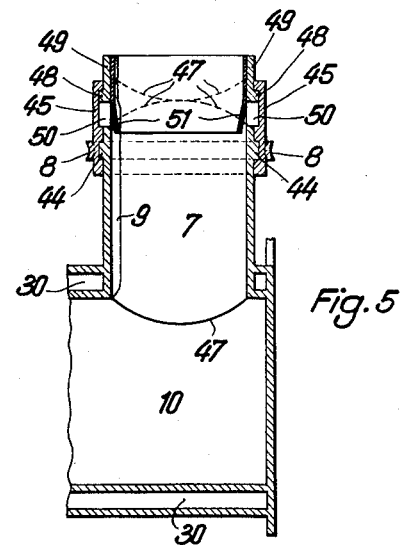
Fig. 5
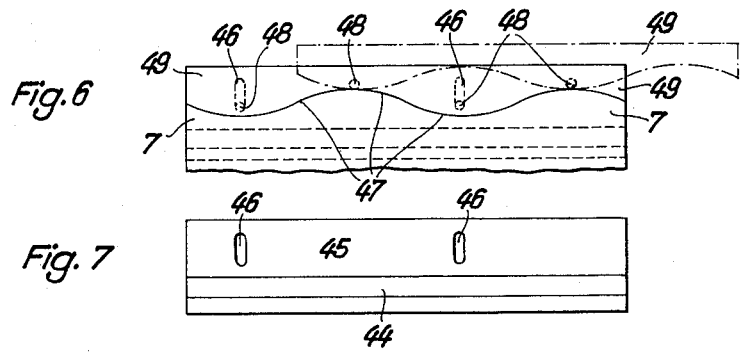
Fig. 6
Fig. 7
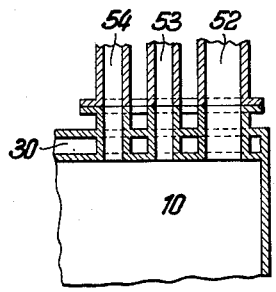
Fig. 8
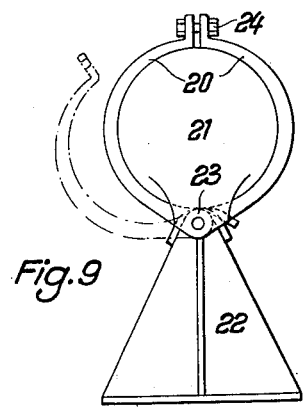
Fig. 9
Inventor:
HANS STRAHMANN
BY:

Jan. 13, 1959  H. STRAHMANN  2,868,143
APPARATUS FOR MAKING BREAD AND PASTRY DOUGH
Original Filed Sept. 28, 1953  3 Sheets-Sheet 3

Inventor:
HANS STRAHMANN

2,868,143

APPARATUS FOR MAKING BREAD AND PASTRY DOUGH

Hans Strahmann, Wentorf, Post Reinbek, Germany

Original application September 28, 1953, Serial No. 382,519. Divided and this application October 11, 1954, Serial No. 461,564

5 Claims. (Cl. 107—30)

The present invention relates to the baking art.

More particularly, the present invention relates to an apparatus for making bread and pastry doughs of all types and is a division of my now abandoned co-pending application Serial No. 382,519, filed September 28, 1953, and entitled, "Process and Apparatus for Making Bread and Pastry Dough."

With known processes and apparatus for making such doughs, the kneading time required for kneading a rye bread dough for example, is approximately 25 minutes, while white or mixed bread doughs require a kneading time of approximately 15 minutes. Furthermore, after kneading, such conventional doughs require rest periods which vary for the different types of dough, this rest period taking place before further operations. For example, a rye bread dough requires a rest period of 20 minutes, a mixed bread dough between 25 and 30 minutes, and a white bread dough, which may also be used for pastries if desired, requires a rest period of between 30 and 45 minutes. The final step in making such doughs is the placing of pieces of the dough into a suitable chamber where the dough rises.

With the known processes for making doughs of all types such as bread doughs, for an average of 100 kg. of flour for rye bread approximately 62 liters of liquid must be mixed with the flour, while white bread requires approximately 53 liters of liquid per 100 kg. of flour and mixed bread requires approximately 55 liters of liquid per 100 kg. of flour. If these amounts of liquid are substantially exceeded, undesirable results are produced. For example, if the above amounts of liquid per 100 kg. of flour are exceeded by 5 liters, an unsatisfactory bread having damp incompletely baked parts will be produced.

As is apparent from the above factors, the kneading time for conventional bread and pastry doughs requires approximately 15 to 25 minutes, and this is a sufficient period for a fairly solid body of dough to form, so that with conventional processes and apparatus there is the danger that the dough will be undesirably torn by the kneading apparatus, and such tearing makes further formation of the dough into desired shapes almost impossible. Furthermore, this period of time is sufficient for the yeast in the dough to start forming a substantial amount of carbon dioxide which is undesirably pressed out of the dough by the kneading action and therefore is not retained in the dough to produce the best possible rising thereof. Thus, with the known processes, the kneading time necessarily and undesirably overlaps with the development of the dough into a substantially solid mass and with the rising of the dough.

One of the objects of the present invention is to overcome the above drawbacks by providing a kneading time which is less than one minute, preferably between 10 and 40 seconds.

A further object of the present invention is to provide a homogeneous dough during this extremely short kneading period.

Another object of the present invention is to mix with the flour an amount of water which is substantially in excess of the conventional amounts referred to above without deleteriously affecting the final product.

An additional object of the present invention is to provide a dough forming apparatus which is of a simple construction and which at the same time is capable of reliably accomplishing the desired results.

Due to the extremely short kneading time produced with the apparatus of the present invention, it is impossible for a substantially solid body of dough to develop to become undesirably torn by the kneading apparatus, and at the same time the yeast has not yet had an opportunity to develop carbon dioxide which can be pressed out of the dough by the kneading apparatus.

Furthermore, with the present invention 5 liters more than the conventional amounts of liquid per 100 kg. of flour, indicated above, are mixed with the flour without producing any undesirable results and at the same time substantially increasing the bread output of a given amount of flour. Although 5 liters in excess of the conventional amount of liquid per 100 kg. of flour is preferred, satisfactory results may also be obtained where the excess liquid is between 4 and 6 liters. For each 100 kg. of flour an additional 4 to 5 kg. of bread is produced with the apparatus of the invention.

Also, as was mentioned above, after kneading with conventional processes and apparatus, the dough requires a rest period which varies from 20 to 45 minutes. However, with the process of the invention a rest period of only 2 minutes, approximately, is required irrespective of the type of dough. The dough rising period is the same with the present invention as with conventional processes.

With the apparatus of the invention an extremely homogeneous kneading is provided so that ll particles of flour come in contact with the liquid, and in this way even though the dough is still damp and sticky when it leaves the kneading apparatus, all of the water is absorbed during the rest period of approximately 2 minutes so that at the end of this rest period, even though more than a conventional amount of liquid has been used, the dough has dried sufficiently to enable the further processing of the dough to take place immediately after this short rest period.

It is also an object of the present invention to provide an apparatus which does not permit any part of the material to be worked on to remain stationary behind the moving material so that in this way pieces of rising dough cannot become located in the apparatus of the invention to undesirably affect the operation thereof.

Furthermore, it is an object of the present invention to provide a fully continuous and automatic apparatus for making doughs of all types, and the above-mentioned rest period of approximately 2 minutes may take place on conveyer belts which direct the dough away from the kneading and cutting apparatus and the like.

Also, it is an object of the present invention to provide an apparatus which produces the dough at a uniform rate in a continuous manner and which cuts the dough at uniform periods into pieces of uniform size and weight.

It has been found that bread made with the apparatus of the present invention has a uniform porosity, taste, and weight, as well as a larger volume than conventional breads and a capability of remaining fresh for approximately 4 days longer than conventional breads made with conventional processes and apparatus.

Furthermore, the apparatus of the present invention requires only simple and relatively little servicing, cleaning, and other operations which must be performed by attendants, so that the labor requirements and wages required for workers using the apparatus of the present invention are greatly reduced, the dough being manufactured without any hand operations in a fully automatic and continuous manner.

With the above objects in view, the present invention mainly consists of a process for kneading the dough which includes the step of completely kneading the dough within a period of 10–40 seconds and of giving the dough, after the kneading thereof, a rest period of approximately 2 minutes irrespective of the type of dough. Also, the present invention mainly consists of an apparatus which includes a first kneading means for kneading the dough during a first stage of the kneading process and having an inlet and outlet, a second kneading means communicating with the outlet of the first kneading means for kneading dough received from the first kneading means at a rate faster than the rate of kneading in the first kneading means, and a supply means for supplying material to be kneaded to the inlet of the first kneading means. An outlet conduit communicates with the second kneading means for guiding dough therefrom, and a cutting means is operatively connected to the outlet conduit for cutting the dough issuing therefrom into uniform sections.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly diagrammatic, partly sectional side elevational view of an apparatus constructed in accordance with the present invention;

Fig. 2 is a top plan view of the apparatus of Fig. 1;

Fig. 3 is a view of the apparatus of Fig. 1 as seen in the direction of arrow A of Fig. 1;

Fig. 4 is a fragmentary sectional view taken along line B—B of Fig. 2 in the direction of the arrows;

Fig. 5 is a fragmentary sectional view taken along line C—C of Fig. 2 in the direction of the arrows;

Fig. 6 is a fragmentary developed view of the top part of the structure shown in Figs. 4 and 5;

Fig. 7 is a developed view of a sleeve shown at the top of Figs. 4 and 5;

Fig. 8 is a fragmentary sectional elevational view of a different embodiment of a supply means for supplying flour and liquid to the kneading apparatus of Figs. 1 and 2;

Fig. 9 is an elevational view of a support for an outlet conduit of the apparatus, this support being shown as seen in the direction of arrow D of Fig. 1;

Figure 14:
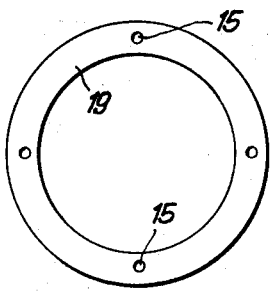
Figure 12:
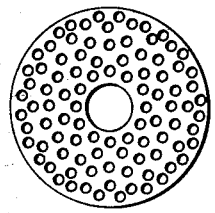
Figure 13:
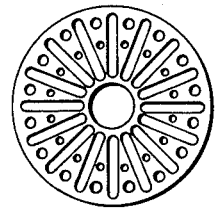

Figs. 12 and 13 respectively are elevational views of two different types of kneading plates; and Fig. 14 is an elevational view of a sealing and bearing ring used in the apparatus of the invention.

All of the parts described below which come into contact with the mixture of flour and liquid or dough into which this mixture is formed, before the dough reaches the conveyer belts described below, are made of a rust proof material such as stainless steel or metallic members which are plated with chrome and the like From non-illustrated containers the raw material, such as flour, water having salt dissolved therein, and yeast suspended in water, are fed to the tube 7 which together with the parts connected to its upper portion form a supply means for supplying materials to the kneading apparatus, this tube 7 communicating with the inlet end of a housing 10 forming part of a first kneading means which kneads the mixture of flour and liquid into a dough during a first stage of the kneading process of the present invention. It is to be understood that the liquid supplied with the flour through the tube 7 is 5 liters in excess of the conventional amount of liquid used for each 100 kg. of flour, 5 liters being preferred although an excess of 4–6 liters will do. In order to prevent the formation of dried mixtures of flour and water on the inner surface of the tube 7, a scraper blade 9 is held against the inner surface of tube 7 and is continually moved circularly about the axis of tube 7 to continuously scrape the inner surface thereof, this blade 9 extending along the entire length of tube 7 without extending beyond the bottom end of tube 7 into the interior of housing 10.

The blade 9 drives its turning movement from a motor and gear unit 1 which rotates a shaft 2 which is turnably mounted in the housing 10, which extends along the axis thereof, and which extends beyond the outlet end of housing 10, as will be described below. A sprocket wheel 3 is fixed to shaft 2 for rotation therewith, and a second sprocket wheel 3 is fixed to a shaft 5 mounted for rotation on a suitable stationary frame work located adjacent the top end of tube 7, as shown in Figs. 1 and 2. The sprocket wheels 3 are interconnected by a chain 4 which transmits rotation of the lower sprocket wheel 3 of Fig. 1 to the upper sprocket wheel 3 and shaft 5. A worm 6 is fixed to the shaft 5 for rotation therewith and meshes with a worm gear 8 so as to rotate the latter, this worm gear 8 being fixed on a sleeve 45 formed in its inner surface with an annular groove 44 into which an annular projection on the outer surface of tube 7 extends so as to guide sleeve 45 for turning movement about the axis of tube 7 (see Figs. 4, 5 and 7). The sleeve 45 extends above the top end of tube 7 and is formed with a plurality of vertically extending recesses 46 also located above the tube 7, these recesses 46 being formed on the inner surface of sleeve 45.

As is apparent from Figs. 1 and 5, the bottom end of tube 7 is curved along its edge so as to conform to the intersection between the cylindrical tube 7 and the cylindrical housing 10, and therefore it is necessary to move the blade 9 vertically during its circular movement so that the blade 9 always has its bottom end located along the bottom edge 47 of tube 7 without extending into the housing 10 beyond this bottom edge 47. To accomplish this result the top edge of the tube 7 is also curved as shown at 47, this top edge being identical with bottom edge of tube 7 but being 180° out of phase therewith as is apparent from Fig. 5.

A second sleeve 49 is located within the sleeve 45 over the tube 7 and is fixed to the top end of blade 9 to maintain the latter against the inner surface of tube 7. This inner sleeve 49 is provided with projections 48 which respectively extend into the recesses 46 so that the sleeve 49 turns with the sleeve 45 but at the same time is free to move vertically with respect to the sleeve 45. The bottom edge of the sleeve 49 is also curved, as shown at 47 in Fig. 5, identically with the top and bottom edges of the tube 7, this curvature of the bottom edge of sleeve 49 also being shown in Fig. 6. As is apparent from Fig. 5, the blade 9 is fixed to one of the portions of sleeve 49 which is of the shortest length so that when the lowermost part of sleeve 49 engages the uppermost part of tube 7, as shown in Fig. 5, the blade 9 will be raised so that its bottom end is located at the uppermost part of the bottom edge 47 of tube 7, and as sleeves 45 and 49 rotate it is apparent that the blade 9 will be moved up and down so that its bottom end moves along the bottom edge 47 of tube 7. In order to prevent material from becoming located within the recesses 46 and within the spaces 50 between tube 7 and sleeve 49, a shield 51 is fixed to the inner surface of tube 49 with the free side edges of the shield respectively located against opposite sides of blade 9, this shield having an inwardly directed bottom conical portion located over the space 50 and recesses 46 to prevent the material supplied through tube 7 to housing 10 from becoming located within spaces 50 or recesses 46.

A different embodiment of a supply means is illustrated in Fig. 8 according to which an independent supply tube 52 is provided to supply only flour directly to the interior of housing 10 at the inlet end thereof, and separate liquid supplying tubes 53 and 54 are provided to directly supply liquids under pressure to the interior of housing 10 where the liquids mix with the flour to be kneaded within the housing 10. It is to be noted that the liquid supply tubes 53 and 54 are located between the flour supply tube 52 and the outlet end of housing 10. Since the mixture in housing 10 continuously moves toward the outlet end thereof, it is apparent that the flour from tube 52 moves toward the tubes 53 and 54 while the liquid from tubes 53 and 54 cannot move toward the tube 52, and in this way the formation of encrustations of dried matter at the outlet end of tube 52 is prevented. The liquid under pressure flowing from tubes 53 and 54 prevents encrustations from forming at the bottom ends of these tubes, and furthermore the tips of the kneading blades engage the inner surface of housing 10 to scrape away any encrustations in the vicinity of tubes 53 and 54.

As is apparent from Fig. 1, the material supplied to the interior of housing 10 through tube 7 (or through tubes 52—54) comes into contact with the kneading blade units I and II. Five such units are shown in Fig. 1, although this number may be varied as desired. Each of these blade units includes, for example, three blades extending radially from a hub portion which is keyed to portion 2a of shaft 2 so as to be rotatable therewith and easily removable therefrom. For example, a single key may extend along the length of the shaft and extend into suitable axial keyways formed in the inner surface of each hub portion of the blade units I and II. The blades of each blade unit are staggered with respect to the blades of the preceding and succeeding units, by an angle of 45°, for example, so that it is impossible for any part of the material to remain stationary within the housing 10 and to form a rising body of dough which undesirably affects the operation of the apparatus. As is apparent from Fig. 1, the tips of the blades of all of the blade units I and II are in slidable engagement with the inner surface of housing 10 so as to prevent any encrustations from forming on this surface. The housing 10 may be cooled or heated, for example by water, steam, or electricity, and in the example illustrated a water jacket 30 and in the illustrated example supply tubes 31 communicating with water jacket 30 are provided about the outside of housing 10 to circulate a cooling or heating liquid or gas along the outer surface of housing 10 so as to control the temperature of the kneading apparatus.

Figure 10:
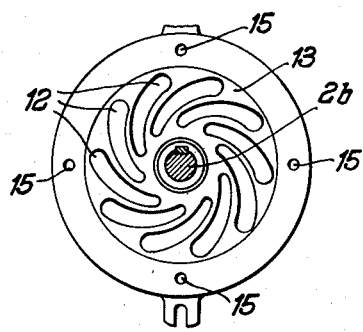
Fig. 10 is an elevational view of a kneading plate of the invention.
Figure 11:
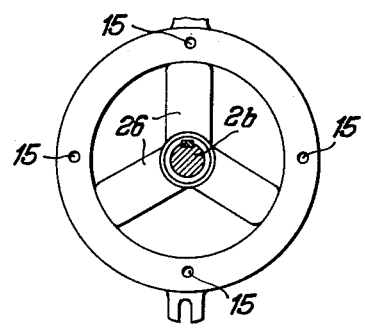
Fig. 11 is a partly sectional elevational view of a blade kneading unit shown with a plate similar to that of Fig. 10, the apertures being omitted from the plate as shown in Fig. 11 for the sake of clarity.

A second kneading means 11 communicates with the outlet of housing 10 of the first kneading means to receive the kneaded material therefrom, this second kneading means 11 kneading the material at a substantially greater rate than the first kneading means described above. The kneading means 11 includes a plurality of kneading plates 13, seven, for example, formed with apertures 12 through which the material moves (Fig. 10). The plates 13 are arranged along the free portion 2b of shaft 2 which extends beyond the outlet end of housing 10 and are spaced from each other along the shaft 10 and are freely rotatable with respect to the same. A plurality of additional blade kneading units 25, similar to units I and II, are respectively located between each pair of plates 13, as shown in Fig. 1, and are removably keyed to the shaft portion 2b for rotation therewith, one additional blade unit 26 being located on the outlet side of the plate 13 most distant from housing 10, as is apparent from Fig. 1. As is apparent from Fig. 10, the apertures 12 are curved and become narrower as they approach the shaft portion 2b.

Each plate 13 is provided with a peripheral flange extending from the opposite faces thereof, and these flanges are in eagagement with each other so that the plates 13 form chambers in which the blade units 26 are respectively located, the blades of these blade units engaging the slide surfaces of plates 13 and the inner surfaces of their peripheral flanges so that it is impossible for encrustations to form in the chambers where the blade units 26 are located. Each of the plates 13 is provided at an outer side surface of its peripheral flange with a plurality, four, for example, of pins 15 which extend into mating openings of the next plate 13 so that all of the plates 13 are in this way connected together for simultaneous rotation as a unit.

As is shown in Fig. 12, the plates 13 may be provided only with circular apertures, or, as shown in Fig. 13, the plates 13 may be provided with circular and elongated apertures.

As is apparent from Figs. 1, 2, 10 and 11, the peripheral portions of plates 13 have lugs fixed thereto and extending therefrom and formed with cut outs, so that when these lugs are aligned rods 14 may be located in these cut outs to further serve to connect the plates 13 together for simultaneous rotation as a unit. Nuts which are respectively mounted on the free left ends of rods 14, as viewed in Figs. 1 and 2, serve to draw the plates 13 tightly into engagement with each other at their peripheral flanges. The plates 13 may respectively have differently shaped apertures 12, and also these plates may be staggered with respect to each other so that the apertures of each plate are out of line with the apertures of the succeeding and preceding plates.

The plates 13 are turned in a direction opposite to the direction of rotation of shaft 2 and blade units 26, I, and II therewith. To accomplish this result a ball bearing 16 is mounted on the outer surface of housing 10 and turnably supports a gear 17 which meshes with a pinion 28 and which is fixed to the right ends of rods 14, as shown in Fig. 1. The pinion 28 is fixed on a shaft 27 which is turned by the motor and gear unit 1 independently of the shaft 2, the direction of rotation of shaft 27 being such that the plates 13 turn in a direction opposite to the direction of rotation of blade units 26. A bearing and sealing ring 19 is located between a flange of housing 10 at the outlet end thereof and the plate 13 nearest to housing 10 to form a bearing for the plates 13 and to seal the space between the latter and housing 10. As is apparent from Fig. 14, the ring 19 is provided with pins 15 which extend into corresponding openings of the flange of housing 10 to maintain the ring 19 stationary, although this ring 19 could also be connected to the right hand plate 13, as viewed in Fig. 1 and turned together with this plate 13 and with respect to the housing 10. A thrust bearing 18 is located between the flange of housing 10, at the outer end thereof, and an inwardly extending annular portion of gear 17, and the housing 10 is provided with a second flange which engages the right side surface of gear 17, as shown in Fig. 1.

It is believed to be apparent that the second kneading means 11 is capable of rapidly kneading the material received from the first kneading means in a completely homogeneous manner by successively subjecting the material to the action of blade units 26 which additionally force the material through the openings 12 of plates 13. It is possible to regulate the temperature of kneading means 11 so as to maintain this kneading means at the best possible temperature for the material being kneaded. For example, any suitable known heating or cooling apparatus may be associated with the outer peripheries of kneading plates 13 so as to cool the latter, for example, when the apparatus is operating at a high output, to remove the heat produced by the friction within the apparatus.

The last blade unit 26 located at the outlet side of the last kneading plate 13 moves the dough along an outlet conduit 21 which has its outlet end 29 directed vertically and downwardly. As is apparent from Fig. 1, the peripheral flange of the last plate 13 is especially formed with an annular shoulder to cooperate with the inlet end of the conduit 21, and a sealing and bearing ring 25, similar to ring 19, is located between this last plate 13 and the conduit 21, the ring 25 being fixed either to the last ring 13 or the conduit 21 through the medium of pins extending into mating openings of the last ring 13 or conduit 21. Also, as is shown in Fig. 1, rigid struts extend radially inward from the inner surface of conduit 21 and support a bearing through which the left end portion of shaft portion 2b extends, as shown in Fig. 1, so that in this way the outermost free end of the shaft 2 is supported for rotation.

As is shown in Figs. 1 and 9, the outlet conduit 21 is supported by a stationary pedestal 22 to which a pair of substantially semi-circular straps 20 are hingedly connected at 23, these straps being removably connected together at their top ends by a bolt and nut means 24, or the like. The straps 20 extend along and about the outer surface of conduit 21 and removably clamp the latter to the pedestal 22 so as to maintain the conduit 21 in operative engagement with the last ring 13. Thus, the straps 20 provide means for easily exchanging one outlet conduit 21 for a different outlet conduit of a different size.

The end 29 of conduit 21 is formed with a blade guide 33 extending across the conduit 21, and this blade guide 33 supports a cutting blade 35 for reciprocating movement across the outlet 29 of conduit 21. The blade 35 is connected through any suitable linkage to a crank driven by the motor 34 so that the motor reciprocates blade 35 across the guide 33. Also, it is possible to make the cutting blade 35 sufficiently flexible to connect this blade directly to the crank and to simply allow the blade to bend up and down at the part thereof located between guide 33 and the crank during reciprocation of the blade.

The blade 35 periodically cuts dough pieces 36 from the length of dough issuing from conduit 21, and these pieces of dough fall onto a conveyer belt 39 supported by a frame 37 and rotated by a motor 38 which through a belt drive turns one of the rollers which supports the belt 39, the motor 38 also being mounted on the frame 37, and this frame 37 being mounted for reciprocating turning movement about the vertical axis $x$, as shown by the double arrow in Fig. 2. Any suitable means (not shown) may be provided to turn the frame 37 back and forth about the axis $x$, such as, for example, a motor turning a crank connected to the frame 37. The pieces of dough 36 fall from the belt 39 onto the conveyer 40 located therebeneath, this belt 40 being driven from the motor 41 by a suitable belt drive connected to one of the rollers which support the belt 40. The turning movement of frame 37 and belt 39 about axis $x$ distributes pieces of dough 36 across the width of belt 40 which carries the pieces of dough into engagement with a belt 42 moving in the direction indicated by the arrow in Fig. 1 so as to cooperate with belt 40 for forming the pieces of dough 36 into a desired shape. The belt 40 moves at a faster linear speed than the belt 42 so that while the latter cooperates with the belt 40 to shape the dough the pieces of dough are nevertheless advanced along the conveyer 40 toward the discharge end thereof.

The motor and gear unit 1 is driven at a single predetermined speed which produces a continuous uniform discharge of the dough from the outlet conduit 21, and the blade 35 is uniformly reciprocated so that the pieces 36 are of a uniform size and weight. Thus, a fully automatic apparatus is provided for continuously manufacturing dough for bread and pastries of all types. The conveyer 39 as well as the conveyer 40 and the speed of movement of conveyer 42 with respect to the speed of movement of conveyer 40 are so designed and regulated that the pieces 30 remain for a period of approximately 2 minutes on these conveyers until they arrive at the discharge end of conveyer 40 from where they are delivered to another conveyer belt of a chamber in which the dough rises, this chamber for example being 30 cm. high and made of telescoped sections so that the rising chamber may be lengthened or shortened to accommodate the rising chamber to the particular type of dough passing through the same, that is, to maintain the dough within the rising chamber for the length of time required by the particular dough.

While the invention has been illustrated and described as embodied in a dough making apparatus, it is not intended to be limited to the details shown, since various modifications and structural changes may be made without departing in any way from the spirit of the present invention.

It will be understood that each of the elements described above, or two or more together, may also find a useful application in other types of automatic dough making processes and apparatus differing from the types described above.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Kneading apparatus for kneading bread and pastry doughs of all types, comprising, in combination, an elongated stationary housing having a central axis and an inlet and outlet end; a shaft having its axis coincident with said central axis, being mounted in said housing for rotation about said central axis, and having a free portion extending through a substantial distance beyond said outlet end of said housing; supply means communicating with said inlet of said housing for supplying a mixture of flour and liquid thereto to be kneaded therein; a plurality of blade units, each of which includes a hub and a plurality of kneading blades extending radially therefrom, removably fixed to said shaft for rotation therewith and being located next to each other on said shaft at the portion thereof located within said housing and being spaced from each other along said shaft at said free portion thereof; a plurality of apertured kneading plates respectively located between said spaced blade units on said free portion of said shaft, said plates being connected together for rotation as a unit and being freely turnable on said shaft for rotation with respect to the same; first sealing means located between said housing and the plate nearest to said outlet end of said housing; turning means operatively connected to said shaft and plates for simultaneously turning the same in opposite directions, respectively, so that all of said blade units turn together in a direction opposite to the turning direction of said plates; and an outlet conduit communicating directly with the plate most distant from said housing; second sealing means located between said outlet conduit and said last-mentioned plate.

2. Kneading apparatus as defined in claim 1 and wherein the blades of each of said blade units are staggered with respect to the preceding and succeeding blade units located on said shaft.

3. Kneading apparatus as defined in claim 1 and wherein each pair of plates located on opposite sides of each blade unit mounted on said free portion of said shaft includes peripheral flanges, respectively, which engage each other to form a chamber in which each of said last-mentioned blade units is located, the blades of the latter blade units engaging at their outer tips the inner surfaces of said peripheral flanges and the blade units within said housing having their outer tips in engagement with the inner surface of said housing.

4. Kneading apparatus as defined in claim 1 and wherein said turning means comprises a single motor, a first drive extending from said motor to said plates, and a second drive independent of said first drive and being connected to said shaft.

5. Kneading apparatus as defined in claim 1 and wherein all of said plates have at their outer peripheries aligned projections formed with cut-outs, a plurality of rods extending through said cut-outs, a gear turnably mounted on the outer surface of said housing and being fixedly connected to said rods so that turning of said gear turns said rods and plates together with said gear, said gear forming part of said turning means and the latter including a drive operatively connected to said gear.

References Cited in the file of this patent

UNITED STATES PATENTS

| | | |
|---|---|---|
| 96,804 | Hawkins | Nov. 16, 1869 |
| 523,116 | Gelinck | July 17, 1894 |
| 541,642 | Traiser | June 25, 1895 |
| 1,683,051 | Peterson | Sept. 4, 1928 |
| 1,790,347 | Hawkins | Jan. 27, 1931 |
| 1,881,171 | Cooley | Oct. 4, 1932 |
| 2,078,565 | Durst et al. | Apr. 27, 1937 |
| 2,524,999 | Schulerud | Oct. 10, 1950 |